(12) United States Patent
Chen

(10) Patent No.: US 8,396,495 B2
(45) Date of Patent: Mar. 12, 2013

(54) METHOD AND SYSTEM OF CHARGING FOR SHORT MESSAGE VALUE-ADDED SERVICE, DATA CENTER FOR SHORT MESSAGE SERVICE

(75) Inventor: Ning Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 188 days.

(21) Appl. No.: 12/791,718

(22) Filed: Jun. 1, 2010

(65) Prior Publication Data

US 2010/0255863 A1    Oct. 7, 2010

Related U.S. Application Data

(63) Continuation of application No. PCT/CN2008/073817, filed on Dec. 29, 2008.

(30) Foreign Application Priority Data

Dec. 27, 2007  (CN) .......................... 2007 1 0301134
Apr. 8, 2008   (CN) .......................... 2008 1 0089583

(51) Int. Cl.
  *H04W 4/00* (2009.01)
(52) U.S. Cl. ........ 455/466; 455/406; 455/407; 455/408; 455/409
(58) Field of Classification Search .............. 455/466, 455/406–409
  See application file for complete search history.

(56) References Cited

U.S. PATENT DOCUMENTS

| 6,473,622 | B1 * | 10/2002 | Meuronen ..................... 455/466 |
| 2004/0187007 | A1 | 9/2004 | Vincent et al. |
| 2005/0276402 | A1 | 12/2005 | Tang et al. |
| 2006/0168004 | A1 * | 7/2006 | Choe et al. .................. 709/206 |
| 2008/0293386 | A1 * | 11/2008 | Noldus ....................... 455/414.1 |

FOREIGN PATENT DOCUMENTS

| CN | 1263674 A | 8/2000 |
| CN | 1852465 A | 10/2006 |
| CN | 1964514 A | 5/2007 |
| CN | 101035004 A | 9/2007 |
| CN | 101257660 A | 9/2008 |
| EP | 1460868 A1 | 9/2004 |
| EP | 1865731 A1 | 12/2007 |
| EP | 2117162 A1 | 11/2009 |
| KR | 20050006383 A | 1/2005 |

(Continued)

OTHER PUBLICATIONS

1st Office Action in corresponding European Application No. 08866619.3 (Jan. 28, 2011).

(Continued)

*Primary Examiner* — Chuong A Ngo
(74) *Attorney, Agent, or Firm* — Leydig, Voit & Mayer, Ltd.

(57) ABSTRACT

The present invention relates to the short message VAS field and discloses a method and a system for charging for short message VAS, and a data center for SMS. The method includes: obtaining a short message that carries VAS subscription information; resolving the VAS to be triggered according to the short message that carries the VAS subscription information, and generating a charging message; and sending the charging message to an intelligent network for charging. The system includes: an SMSC, a data center for SMS, and an intelligent network. The data center for SMS includes: a short message receiving module, a charging message generating module, and a charging message sending module. Through the technical solution under the present invention, the PPS user is refunded for the services triggered unsuccessfully, and the service process is simplified.

7 Claims, 17 Drawing Sheets

FOREIGN PATENT DOCUMENTS

WO    WO 2009/0082980 A1    9/2009

OTHER PUBLICATIONS

State Intellectual Property Office of the People's Republic of China, International Search Report in International Patent Application No. PCT/CN2008/073817 (Apr. 2, 2009).

$2^{nd}$ Office Action in corresponding European Application No. 088666919.3 (Oct. 24, 2011).

State Intellectual Property Office of the People's Republic of China, Examination Report in Chinese Patent Application No. 200810089583.4 (May 11, 2010).

State Intellectual Property Office of the People's Republic of China, English Translation of Written Opinion of the International Searching Authority in International Patent Application No. PCT/CN2008/073817 (Apr. 2, 2009).

$2^{nd}$ Office Action in corresponding Chinese Application No. 200810089583.4 (Nov. 30, 2011).

Extended European Search Report in corresponding European Patent Application No. 08866619.3 (Sep. 27, 2010).

$3^{rd}$ Office Action in corresponding European Application No. 08866619.3 (Feb. 9, 2012).

"3GPP TS 22.XXX—$3^{rd}$ Generation Partnership Project; Technical Specification Group Services and System Aspects; Value Added Services for SMS Requirements; (Release 8)," Oct. 2007, Version 0.1.0, $3^{rd}$ Generation Partnership Project, Valbonne, France.

$3^{rd}$ Office Action in corresponding Chinese Patent Application No. 200810089583.4 (Aug. 1, 2012).

\* cited by examiner

TO FIG. 4B

CONT. FROM FIG. 6A

206 — Upon completion of the process of the called party's call forwarding service and the calling party signature line service, if the state report indicates that the service message is sent unsuccessfully, the calling DCS A records the refund operation flag corresponding to the called party's call forwarding service and the calling signature line service 207 — The called party DCS B delivers the called party SMS warehouse service 208 — Upon completion of the process of the called party SMS warehouse service, if the state report indicates that the service message is sent unsuccessfully, the calling DCS A records the refund operation flag corresponding to the called party SMS warehouse service 209 — After all services of the calling party and the called party are delivered and executed, a uniform refunding operation is performed according to the failed service messages recorded in the refund operation flag

FIG. 6B

METHOD AND SYSTEM OF CHARGING FOR SHORT MESSAGE VALUE-ADDED SERVICE, DATA CENTER FOR SHORT MESSAGE SERVICE

CROSS-REFERENCE TO RELATED APPLICATIONS

This application is a continuation of International Application No. PCT/CN2008/073817, filed on Dec. 29, 2008, which claims priority to Chinese Patent Application No. 200710301134.7, filed on Dec. 27, 2007, and Chinese Patent Application No. 200810089583.4, filed on Apr. 8, 2008, all of which are hereby incorporated by reference in their entireties.

FIELD OF THE INVENTION

The present disclosure relates to mobile communication services, and in particular, to a method and a system of charging for short message Value-Added Service (VAS) and a data center for Short Message Service.

BACKGROUND

Currently, the value-added service (VAS) of Short Message Service (SMS) in China is promoted in its early stage, and lacks perfect traffic models and processes. For example, for PrePaid Service (PPS) users, when a short message submitted to the Short Message Service Center (SMSC) needs to trigger multiple services, the service charging operation and the refund operation are repeated. Moreover, because the charging process in the home network of the calling party is different from the charging process in the home network of the called party, some refund operations need to wait for the result of delivering a remote message before the subsequent process can go on.

In the conventional art, the following two charging methods are available for the foregoing short message VAS:

1. Charging Method that Requires the Service Gateway to Participate in Service Scheduling In order to charge for short message VASs, in the delivery status of the service process, the short message that carries VAS needs to be forwarded to the service gateway through a Data Center for Short Message Service (DCS), and the service gateway participates in the scheduling process and performs charging. As a defect of this method, the network elements unrelated to the service are involved. That is, the service gateway needs to participate in the service scheduling to perform charging for the VAS, thus increasing the complexity of the service process.

2. Charging Method that Requires Assistance of the SMSC

After the DCS handles the service, the optional field of the message submitted to the SMSC carries a charging ID. According to the charging ID, the SMSC performs charging for the service except the communication expense. As a defect of this method, the expense for the short message VAS can be deducted as a communication expense, and the SMSC is unable to record the details of the service expense, namely, unable to perform rating for the service, thus leading to inflexibility of the service charging.

In the process of developing the present disclosure, the inventor finds at least these defects in the conventional art: The method that requires the service gateway to participate in the charging, the service process is too complex; the charging method that requires assistance of the SMSC makes leads to inflexibility of the service charging. No uniform service charging control process is available in the charging method in the conventional art.

SUMMARY

The embodiments of the present disclosure provide a method and a system for charging a PPS user for a short message VAS, and a DCS in order to implement a uniform service charging control process.

The technical solution under the present disclosure is described below.

The method for charging for a short message VAS includes:

obtaining a short message that carries VAS subscription information;

resolving the VAS to be triggered according to the short message that carries the VAS subscription information, and generating a charging message; and sending the charging message to an intelligent network for charging.

The system for charging for a short message VAS includes:

a DCS, adapted to: obtain the short message that carries VAS subscription information, resolve the VAS to be triggered according to the short message that carries the VAS subscription information, generate a charging message, and send the charging message to the intelligent network for charging; and an intelligent network, adapted to perform PPS charging for the user according to the charging message sent by the DCS.

The DCS includes:

a short message receiving module, adapted to obtain a short message that carries VAS subscription information;

a charging message generating module, adapted to: resolve the VAS to be triggered according to the short message that is received by the short message receiving module and carries the VAS subscription information, and generate a charging message; and a charging message sending module, adapted to send the charging message generated by the charging message generating module to the intelligent network for charging.

The technical solution under the present disclosure initiates a uniform charging process after finding the VAS that needs to be triggered by the calling party and the called party. Therefore, the VAS platform works together with the intelligent network to charge the PPS user, and the service charging process is simplified.

DETAILED DESCRIPTION

In order to make the technical solution, objectives and merits of the present disclosure clearer, the embodiments of the present disclosure are described below in more detail by reference to accompanying drawings.

The technical solution under the present disclosure deals with how to trigger multiple VASs after a short message that carries VASs is submitted, how to charge in the case that both the calling party and the called party are PPS users, and how to refund after the service fails.

Embodiment 1

Figure 1:
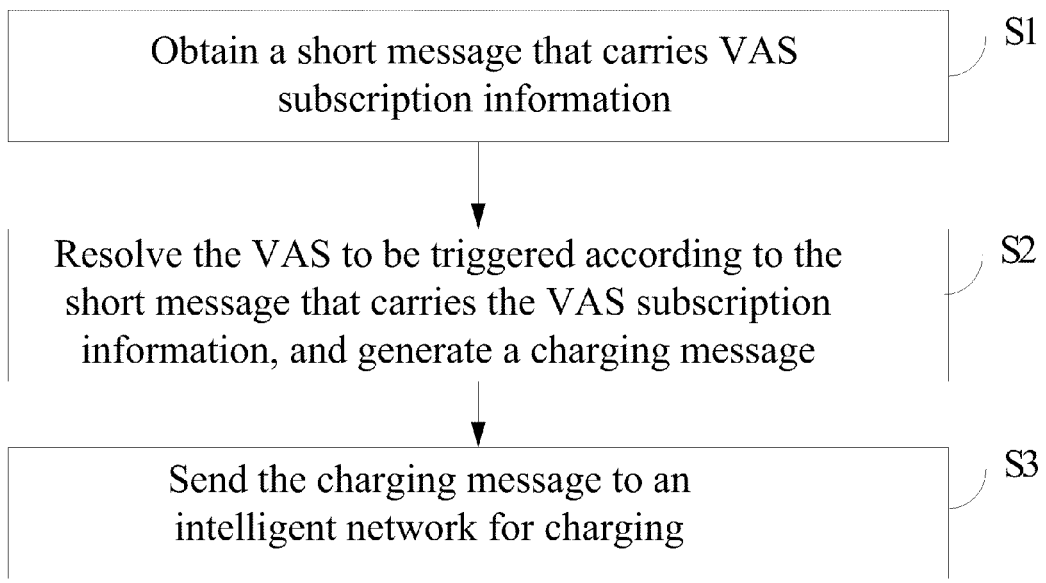
FIG. 1 is a flowchart of a short message VAS charging method provided in the first embodiment of the present disclosure.

As shown in FIG. 1, this embodiment provides a short message VAS charging method. The method includes the following steps:

S1: Obtain a short message that carries VAS subscription information.

S2: Resolve the VAS to be triggered according to the short message that carries the VAS subscription information, and generate a charging message.

S3: Send the charging message to an intelligent network for charging.

The short message VAS charging method provided in this embodiment initiates a uniform charging process after finding the VAS that needs to be triggered by the calling party and the called party. Therefore, the VAS platform works together with the intelligent network to charge the PPS user, and the service charging process is simplified.

Embodiment 2

Figure 2:
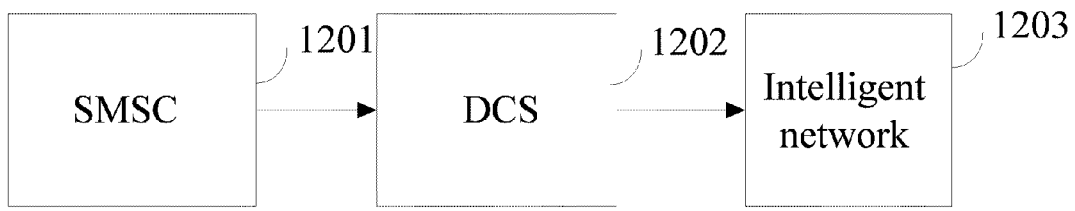
FIG. 2 is a structure of a short message VAS charging system provided in the second embodiment of the present disclosure.

As shown in FIG. 2, this embodiment provides a short message VAS charging system. The system includes:

an SMSC 1201, adapted to receive a short message submitted by the calling party, and send the received short message to a DCS 1202 for processing;

a DCS 1202, adapted to obtain the short message that carries VAS subscription information from the SMSC 1201, resolve the VAS to be triggered according to the short message that carries the VAS subscription information, generate a charging message, and send the charging message to an intelligent network 1203 for charging; and an intelligent network 1203, adapted to perform PPS charging for the SMS user according to the charging message sent by the DCS 1202.

The short message VAS charging system provided in this embodiment initiates a uniform charging process after finding the VAS that needs to be triggered by the calling party and the called party. Therefore, the VAS platform works together with the intelligent network to charge the PPS user, and the service charging process is simplified.

Embodiment 3

Figure 3:
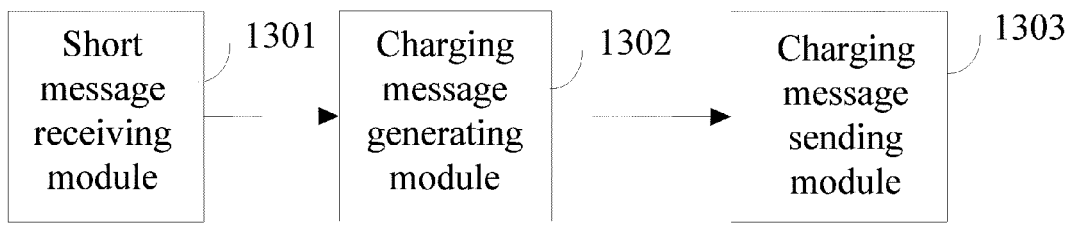
FIG. 3 is a structure of a DCS provided in the third embodiment of the present disclosure.

As shown in FIG. 3, this embodiment provides a DCS. The DCS includes:

a short message receiving module 1301, adapted to obtain a short message that carries VAS subscription information and sent by an SMSC and submitted by a calling party;

a charging message generating module 1302, adapted to resolve the VAS to be triggered according to the short message that is received by the short message receiving module 1301 and carries the VAS subscription information, and generate a charging message; and a charging message sending module 1303, adapted to send the charging message generated by the charging message generating module 1302 to the intelligent network for charging.

The DCS provided in this embodiment initiates a uniform charging process after querying the VAS that needs to be triggered by the calling party and the called party. Therefore, the VAS platform works together with the intelligent network to charge the PPS user, and the service charging process is simplified.

The technical solution under the present disclosure is outlined above, and the embodiments of the present disclosure are elaborated below:

Embodiment 4

This embodiment takes a GSM network as an example, and employs the message process initiated by the home network of the calling party. The home SMSC of the calling party on the VAS platform (including SMSC and DCS) delivers the message.

Figure 4A:
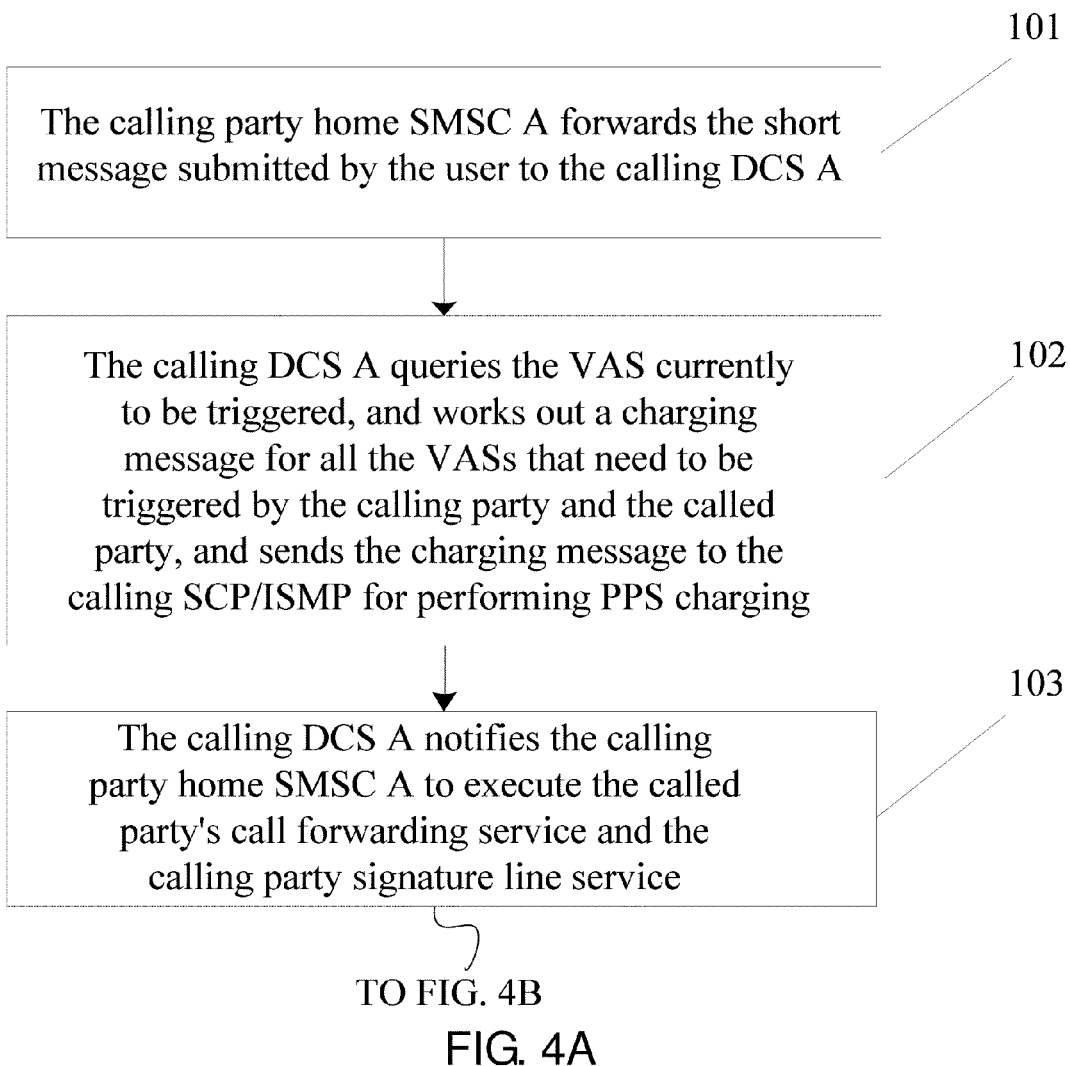
FIG. 4 is a flowchart of a method for charging a local user for a calling party service or a called party service in the PPS process in the home network of the calling party in the fourth embodiment of the present disclosure.
Figure 4B:
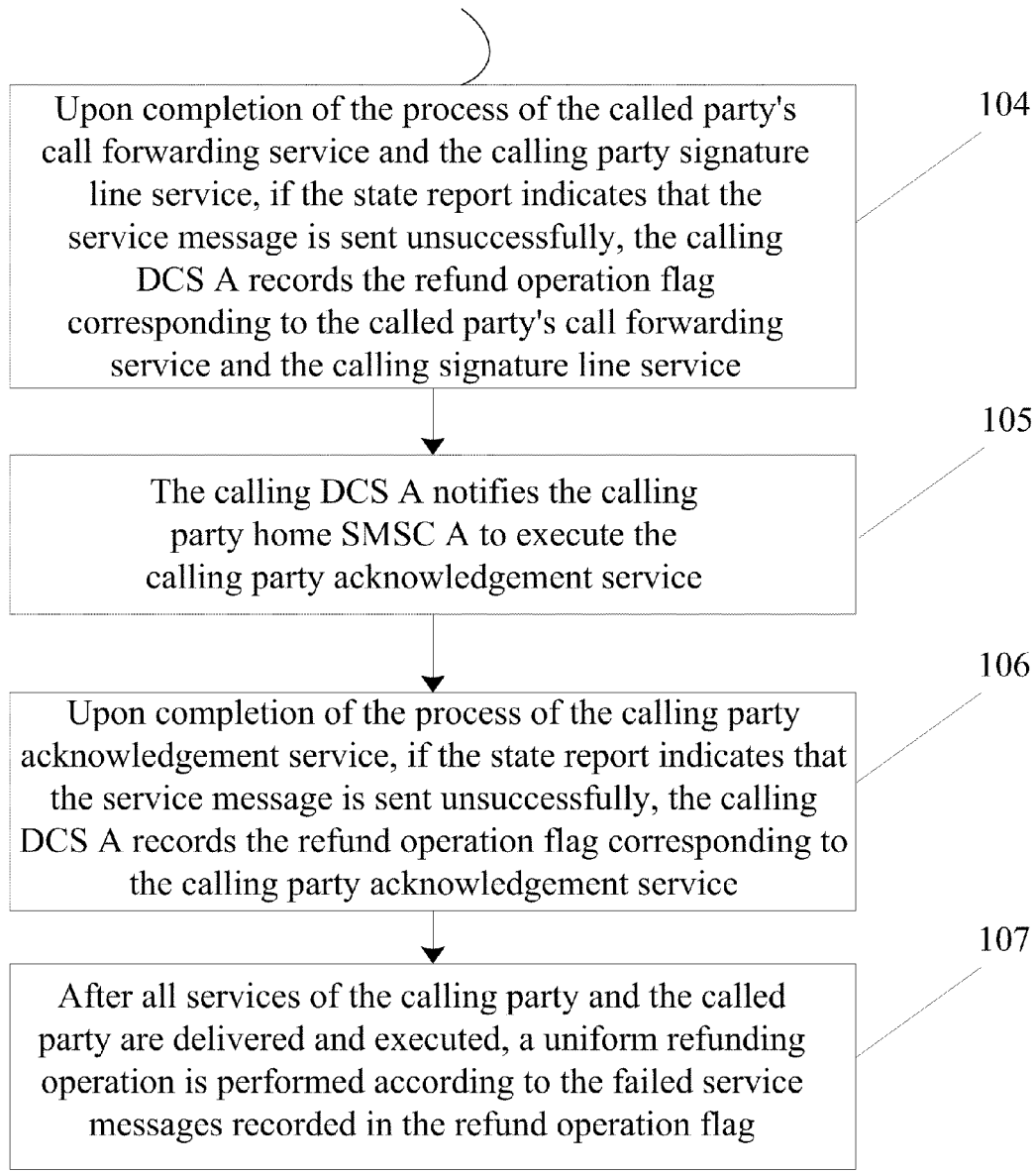

As shown in FIG. 4, this embodiment includes the following steps:

Step 101: The calling party home SMSC A obtains a short message submitted by the calling party, queries whether the calling party and the called party have subscribed to the short message VAS, and forwards the short message submitted by the calling party to the calling DCS A if the calling party and the called party have subscribed to the short message VAS.

Step 102: The calling DCS A queries the service that the calling party and the called party currently need to trigger (this embodiment supposes that the services to be triggered are: calling party return notification, calling party signature line, and called party's call forwarding, or any other VAS provided by the operator), and works out a charging message for all services that the calling party and the called party need to trigger. The calling DCS A sends the charging message to the Service Control Point (SCP) in the calling intelligent network for PPS charging. For the charging components that do not support a single charging message submitted for uniform charging (for example, Integrated Service Management Platform (ISMP)), the calling DCS A needs to generate multiple charging messages for different services to be triggered, and send them to the ISMP one by one, and then the ISMP integrates them into one charging message and sends the charging message to the SCP for performing PPS charging. The SCP and the ISMP are adapted to receive charging messages and refunding messages, and charge the PPS users.

Step 103: The calling DCS A executes the calling party signature line service and the called party's call forwarding service, and notifies the execution status of the service to the home SMSC A of the calling party.

Step 104: When the process of the called party's call forwarding service and the process of the calling party signature line service are ended, if the status report indicates that the called party's call forwarding service or the calling party signature line service fails, the calling DCS A records the refund operation flag corresponding to the called party's call forwarding service or the calling party signature line service.

Step 105: The calling DCS A notifies the calling party home SMSC A to execute the calling party return notification service.

Step 106: When the process of the calling party return notification service is ended, if the status report indicates that the return notification service message is sent unsuccessfully, the calling DCS A records the refund operation flag corresponding to the calling party return notification service.

Step 107: By now, all calling party services and called party services have been delivered and executed. The calling DCS A performs uniform refund operation according to the failed service messages recorded in the refund operation flag. Specifically, the calling DCS A works out a rollback message for all services triggered unsuccessfully by the calling party and the called party, and sends the rollback message to the calling SCP for refunding the PPS user. The calling DCS A may also work out multiple rollback messages and send them to the ISMP, and then the ISMP sends them to the SCP for refunding the PPS user.

Figure 5:
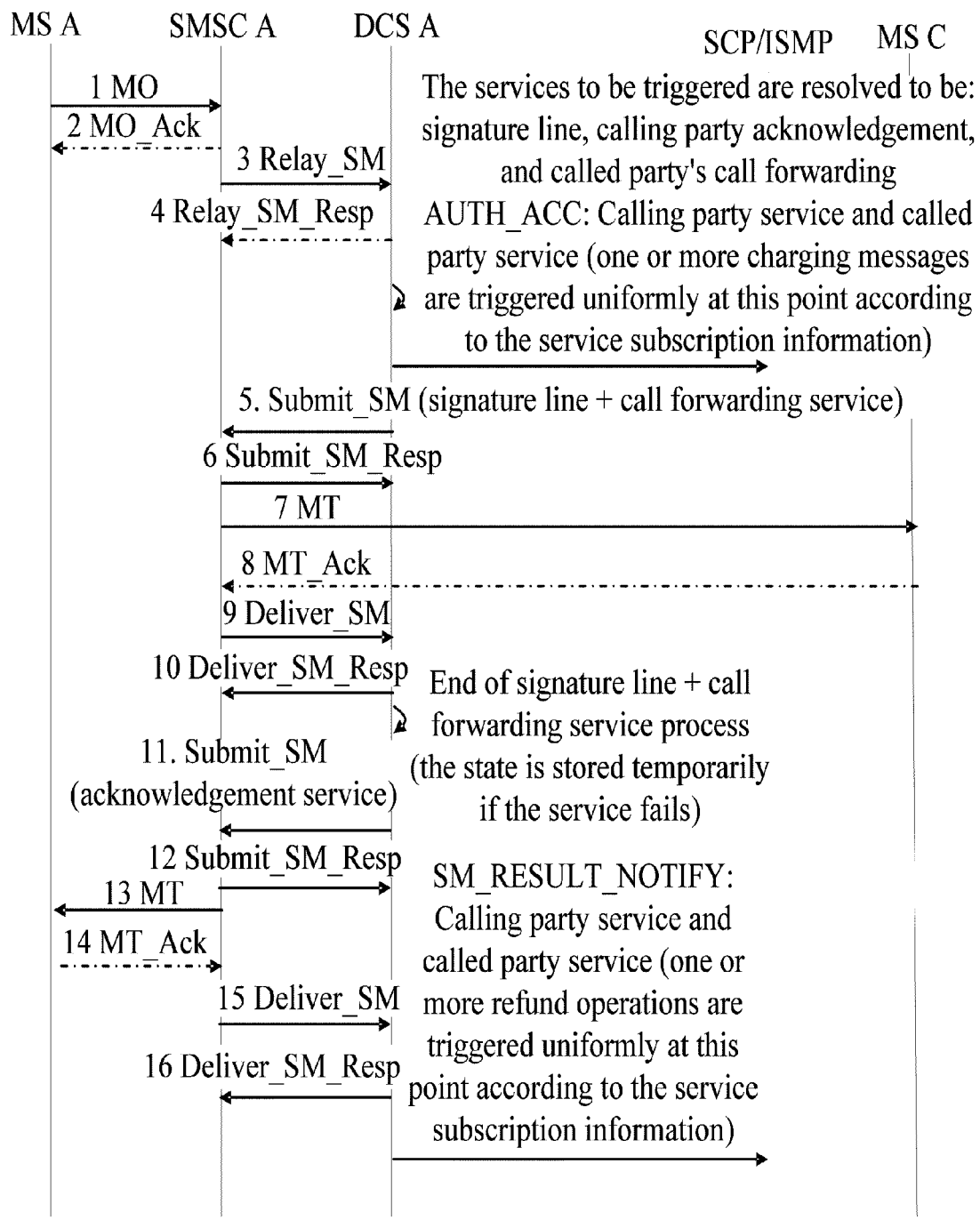
FIG. 5 shows exchange of charging messages for a local user in a calling party service or a called party service in the PPS process in the home network of the calling party in the fourth embodiment of the present disclosure.

As shown in FIG. 5, the detailed interaction process of this embodiment is as follows:

1: The calling user A (MS A) submits a short message to the calling party home SMSC A.

2: The calling party home SMSC A sends back a response. The calling party home SMSC A queries whether the calling party and the called party have subscribed to the short message VAS.

3: If the calling party and the called party have subscribed to the short message VAS, the calling party home SMSC A forwards the submitted short message to the calling DCS A for processing.

4: The calling DCS A returns a response to the calling party home SMSC A. This response indicates that the short message is processed by the calling DCS A.

Through querying, the calling DCS A finds that the services to be triggered currently are: calling party return notification service, calling party signature line service, and called party's call forwarding service. Therefore, the calling DCS A works out a charging message for all services to be triggered for the calling party and the called party before the services are delivered, and sends the charging message to the calling SCP in the form of a charging message field for the purpose of PPS charging. For the charging components that do not support a single charging message submitted for uniform charging (for example, ISMP), the calling DCS A needs to generate multiple charging messages for different services to be triggered, and send them to the ISMP one by one.

Table 1 shows the charging message field that needs to be carried in the PPS charging message process.

TABLE 1

| Field | Type | Description |
| --- | --- | --- |
| Source_Address | String type | Source address |
| Destination_Address | String type | Destination address |
| Chargeflag | 32-bit or 64-bit integer or string type. For integer type, different services are stored according to bits; for the string type, different services are stored according to bytes | Service charging or refund flag. This field may identify multiple services or a single service. This field guides the charging components to perform service charging |

Table 2 shows the usage of the charge flag.

A 32-bit integer stores the service charge flag. In the storage format, the calling party service is separated from the called party service by upper bits and lower bits. The lower 16 bits represent the service of the called party, and the upper 16 bits represent the calling party service. Each bit represents a service, location "0" indicates that no service is triggered, and location "1" indicates that services are triggered.

TABLE 2

| 0000 0100 0010 0000 | 1000 0000 0000 0000 |
| --- | --- |

The charging component judges whether the upper 16 bits or the lower 16 bits of the field are 0s. If they are not 0s, the charging component performs charging according to the service type represented by each bit.

5: The calling DCS A adds the calling party signature line service and the called party's call forwarding service into the message, and submits the submit_SM field message to the calling party home SMSC A.

6: The calling party home SMSC A sends a submit_SM_Resp field, and returns a response to the calling DCS A.

7: The calling party home SMSC A delivers the message which carries the calling party signature line service and the called party's call forwarding service to user C of the called party's call forward service.

8: User C returns a receiving response to the calling party home SMSC A.

9: The calling party home SMSC A sends the status report of the service sending result to the calling DCS A.

10: The calling DCS A returns a status report response of the service sending result to the calling SMSC A.

After completion of the process of the called party's call forwarding service or the calling party signature line service, if the status report indicates that the message is sent unsuccessfully, the calling DCS A records the refund operation flag corresponding to the called party's call forwarding service or the calling party signature line service (the refund operation is not performed here, but is performed uniformly after completion of all service processes).

11: The calling DCS A submits a message of the calling party return notification service to the calling party home SMSC A.

12: The calling party home SMSC A sends a response to the calling DCS A.

13: The calling party home SMSC A sends a calling party return notification to the calling user A.

14: The calling user A returns a receiving response to the calling party home SMSC A.

15: The calling party home SMSC A sends the status report of the calling party return notification to the calling DCS A.

16: The calling DCS A returns a status report response to the calling party home SMSC A. If the status report indicates that the message is sent unsuccessfully, the calling DCS A records the refund operation flag corresponding to the calling party return notification.

By now, all calling party services and called party services have been delivered and executed. The calling DCS A performs a uniform refund operation according to the failed service messages recorded in the refund operation flag. Specifically, the calling DCS A works out a rollback message for all services triggered unsuccessfully by the calling party and the called party, and sends the rollback message to the calling SCP for refunding the PPS user. For the charging components that do not support a single charging message submitted for uniform charging (for example, ISMP), the calling DCS A needs to generate multiple charging messages for different services to be triggered, and send them to the ISMP one by one.

In this embodiment, after the services that the calling party and the called party need to trigger are found, a uniform charging process is initiated, thus unifying the service charging control process and simplifying the VAS process. Before completion of all service processes, the information about the unsuccessfully triggered service is recorded; a uniform refunding process is initiated according to the information about all unsuccessfully triggered services, thus accomplishing the refund operation for the unsuccessfully triggered services.

Embodiment 5

This embodiment takes a GSM network as an example, and employs the message process delivered by the home network of the calling party. The VAS platform finds the VAS of the non-local user who has subscribed to the VAS, and then the home SMSC of the calling party delivers the message uniformly.

Figure 6A:
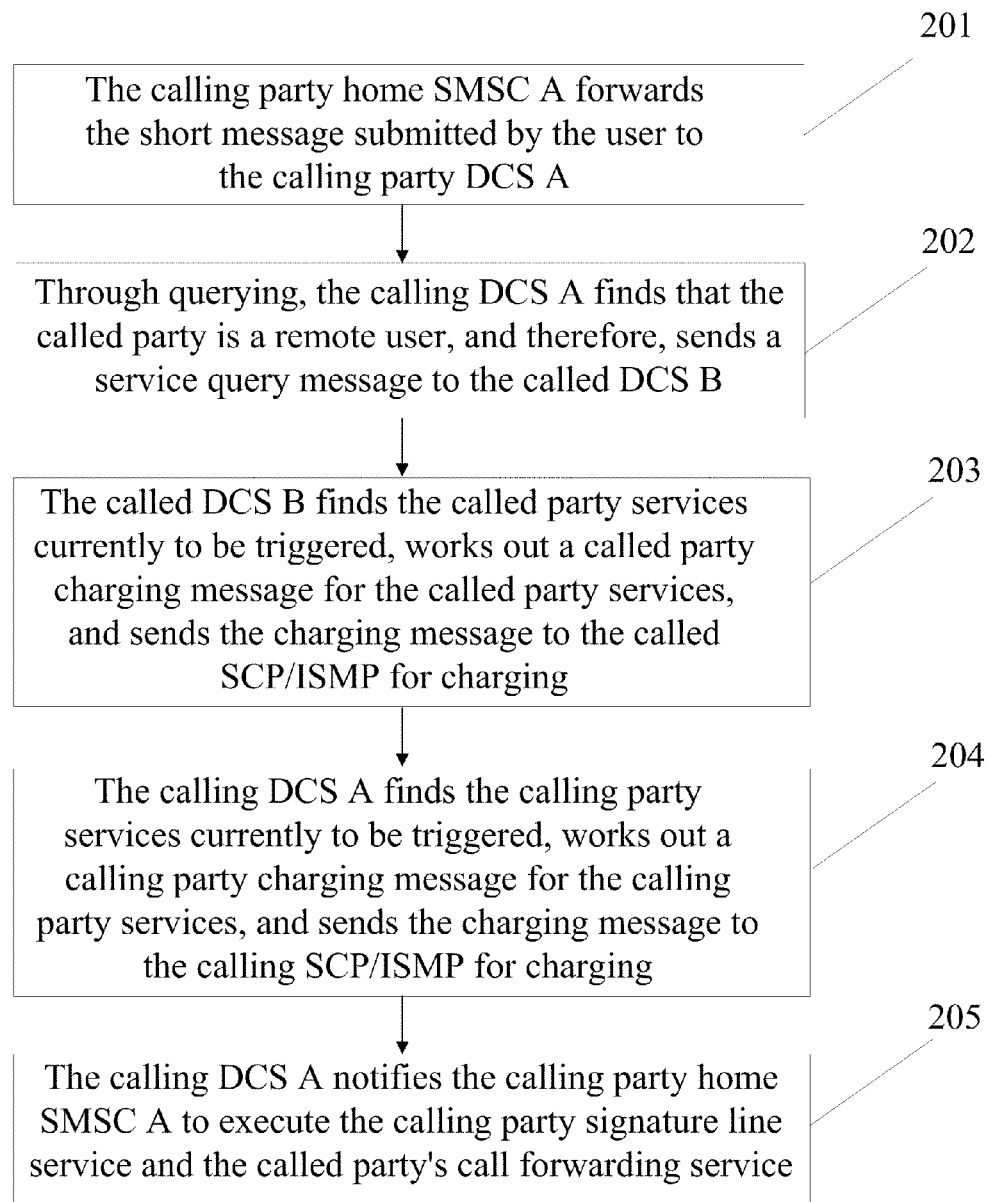
FIG. 6 is a flowchart of a method for charging a remote user for a calling party service or a called party service in the PPS process in the home network of the calling party in the fifth embodiment of the present disclosure.

As shown in FIG. 6, this embodiment includes the following steps:

Step 201: The calling party home SMSC A obtains a short message submitted by the calling party, queries whether the calling party and the called party have subscribed to the short message VAS, and forwards the short message submitted by the user to the calling DCS A if the calling party and the called party have subscribed to the short message VAS.

Step 202: Through querying, the calling DCS A finds that the called party is a remote user, and therefore, sends a service query message to the called DCS B.

Step 203: Through querying, the called DCS B knows that the called party services to be triggered currently are the called party's call forwarding service and the called party warehouse service (or other types of called party services provided by the operator). The called DCS B works out a called party charging message for the called party services to be triggered, and sends the charging message to the called SCP for performing PPS charging; or works out multiple called party charging messages for the called party services to be triggered, and sends the charging messages to the called ISMP for performing PPS charging; and sends the service subscription result of the called party to the calling DCS A.

Step 204: Through querying, the calling DCS A finds that the service to be triggered currently by the calling party is the calling signature line. According to the query result sent by the called DCS B, the calling DCS A knows that the service to be triggered currently is the calling signature line service, and the called party services to be triggered are the called party's call forwarding and the called party warehouse service (this embodiment takes the foregoing three services as examples; in practice, the services may be other VASs provided by the operator). The calling DCS A works out a charging message for the calling party signature line service to be triggered by the calling party, and sends the charging message to the calling SCP for performing PPS charging; or works out multiple charging messages, and sends them to the calling ISMP for performing PPS charging (when there are multiple services to be triggered, one or more charging messages may be worked out).

Step 205: The calling DCS A notifies the calling party home SMSC A to execute the calling party signature line service and the called party's call forwarding service.

Step 206: Upon completion of the process of the calling party signature line service and the process of the called party's call forwarding service, if the status report indicates that the service message is sent unsuccessfully, the calling DCS A records the refund operation flag corresponding to the calling party signature line service and the called party's call forwarding service.

Step 207: The called party DCS B delivers the called party SMS warehouse service.

The SMS warehouse service backs up the short messages sent/received by the user to the system database synchronously. The user may query and manage the short messages through the Web. In this way, the user is provided with a long-term storage space, and is free from the trouble of limited quantity of short messages stored in the mobile station.

Step 208: Upon completion of the process of the called party SMS warehouse service, if the status report indicates that the service message is sent unsuccessfully, the called DCS B records the refund operation flag corresponding to the called party SMS warehouse service.

Step 209: By now, all calling party services and called party services have been delivered and executed. A uniform refund operation is performed according to the failed service messages recorded in the refund operation flag. Specifically, the calling DCS A works out a rollback message for all services triggered unsuccessfully by the calling party and the called party, and sends the rollback message to the calling SCP for refunding the PPS user, or works out multiple rollback messages and sends them to the calling ISMP for refunding the PPS user; the called DCS B works out a rollback message for all services triggered unsuccessfully by the called party, and sends the rollback message to the called SCP for refunding the PPS user, or works out multiple rollback messages and send them to the called ISMP for refunding the PPS user.

Figure 7A:
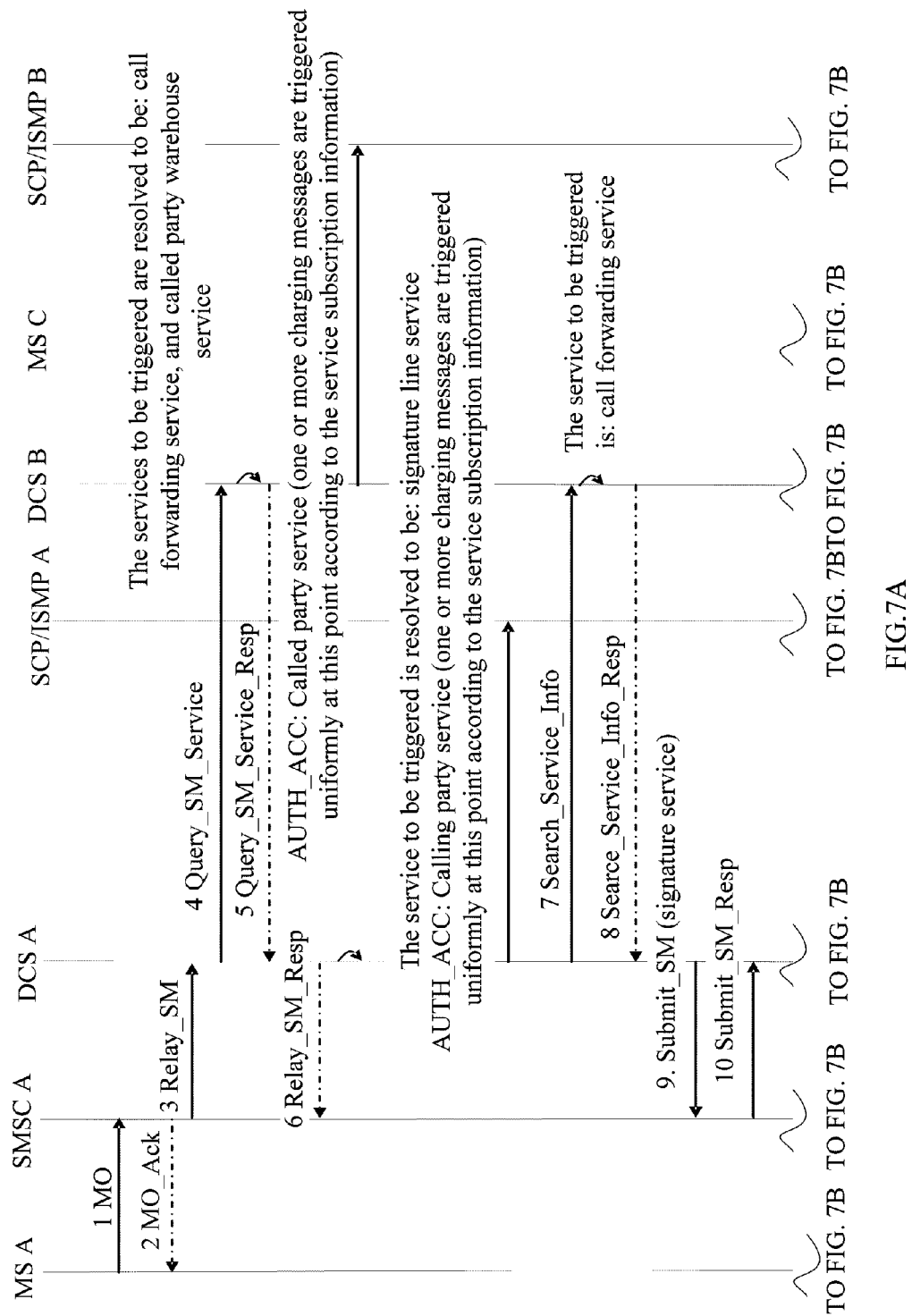
FIG. 7 shows exchange of charging messages for a remote user in a calling party service or a called party service in the PPS process in the home network of the calling party in the fifth embodiment of the present disclosure.
Figure 7B:
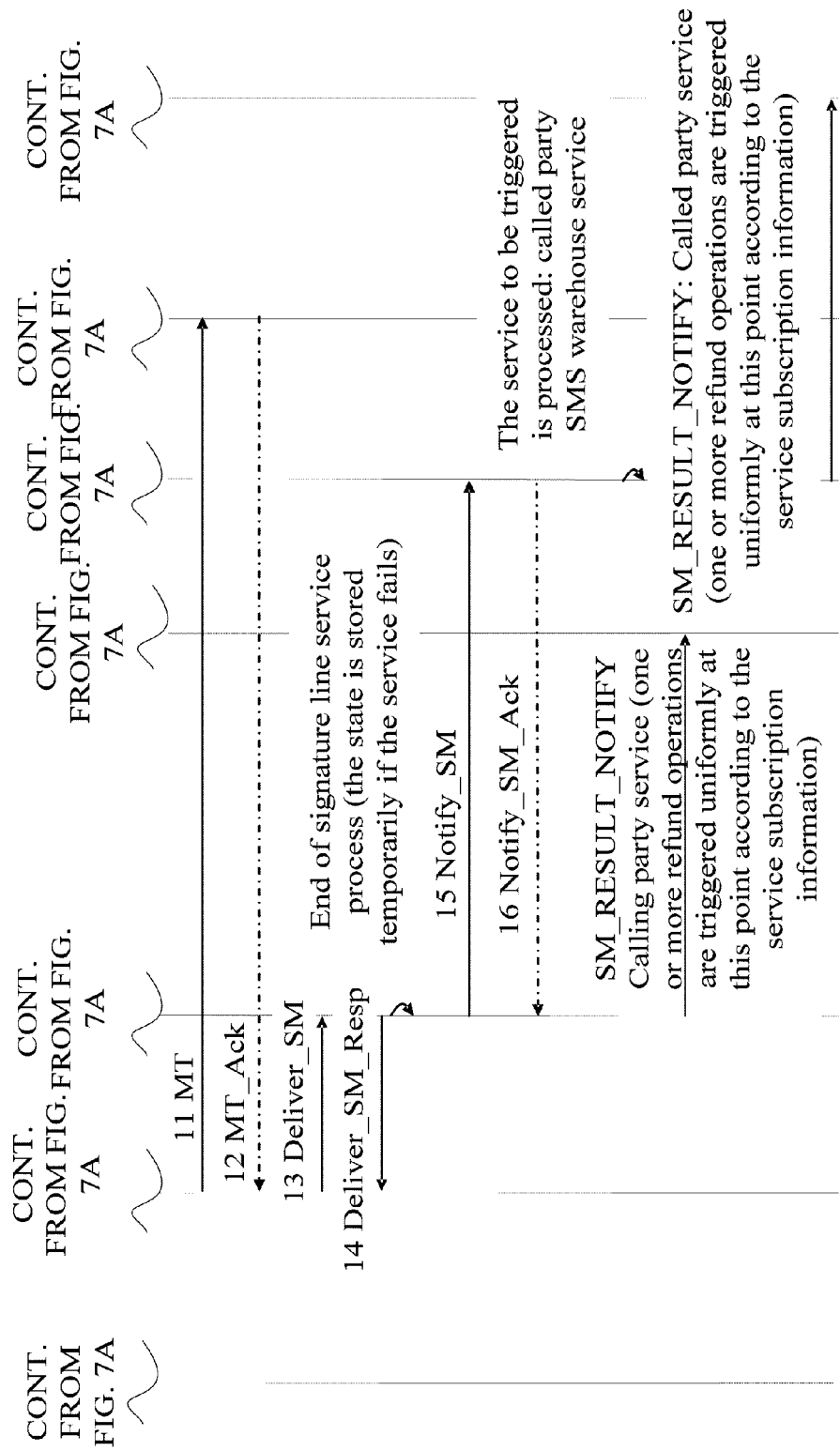

As shown in FIG. 7, the detailed interaction process of this embodiment is as follows:

1: The calling user A (MS A) submits a short message to the calling party home SMSC A.

2: The calling party home SMSC A sends back a response.

The calling party home SMSC A queries whether the calling party and the called party have subscribed to the short message VAS.

3: If the calling party and the called party have subscribed to the short message VAS, the calling party home SMSC A forwards the originally submitted short message to the calling DCS A for processing.

4: The calling DCS A finds that the called party is a remote user, and therefore, sends a service query message to the called DCS B.

5: After querying, the called DCS B returns a service query result to the calling DCS A.

After querying, the called DCS B works out a called party charging message for the called party services to be triggered currently, and sends the charging message to the called SCP for performing PPS charging (if the charging component does not support a single charging message submitted for uniform charging, the called DCS B needs to generate multiple charging messages for different services to be triggered, and submit them at this point uniformly).

6: The calling DCS A returns a response to the calling party home SMSC A. This response indicates that the short message is processed by the calling DCS A.

Through querying, the calling DCS A finds that the services to be triggered currently are: calling party signature line, called party's call forwarding service, and called party warehouse service. Therefore, the calling DCS A works out a charging message for all services to be triggered by the calling party, and sends the charging message to the calling SCP for performing PPS charging. For the charging components which do not support a single charging message submitted for uniform charging (for example, ISMP), the calling DCS A needs to generate multiple charging messages for different services to be triggered, and send them one by one.

7: Because the called party service is included, the calling DCS A sends a service query message, namely, a "Search_Service_info" field, to the called DCS B; and the called DCS B queries the content of the called party's call forwarding service.

8: The called DCS B returns a service triggering relation response, namely, a "Search_Service_Info_Resp" field, to the calling DCS A. The calling DCS A performs subsequent processing according to the service content returned by the called DCS B.

9: The calling DCS A adds the service into the message, and submits the submit_SM field message to the calling party home SMSC A.

10: The calling party home SMSC A returns a submit_SM_Resp field to the calling DCS A.

11: The calling party home SMSC A delivers the message which carries the calling party signature line service and the called party's call forwarding service to user C of the called party's call forward service.

12: User C returns a receiving response to the calling party home SMSC A.

13: The calling party home SMSC A sends the status report to the calling DCS A.

14: The calling DCS A returns a status report response to the calling party home SMSC A.

After completion of the process of the calling party signature line service and the process of the called party's call forwarding service, if the status report indicates that the message is sent unsuccessfully, the calling DCS A records the refund operation flag corresponding to the failed service (such as the calling party signature line service) of the calling party. The refund operation is not performed here, but is performed uniformly after completion of all service processes.

15: The calling DCS A sends a Notify_SM message to the called DCS B. If the status report of the called party service indicates service failure, the Notify_SM message tells the information about the called party service failure to the DCS B. Because this embodiment involves the called party SMS warehouse service, the called party SMS warehouse service is triggered at the same time.

16: The called DCS B returns a service notification response (Notify_SM_Resp) to the calling DCS A. If the received status report indicates failure of sending the message, the called DCS B records the refund operation flag corresponding to the SMS warehouse service.

The DCS B records the refund operation flag corresponding to the failed service of the called party.

By now, all calling party services have been completed. Therefore, a uniform refund operation is performed for the services delivered unsuccessfully. The calling DCS A works out a rollback message for all services triggered unsuccessfully by the calling party, and sends the rollback message to the calling SCP for refunding the PPS user. For the charging components that do not support a single charging message submitted for uniform charging, the calling DCS A may work out multiple rollback messages and send them at this point uniformly. The called DCS B triggers the called party warehouse service, works out a rollback message for all services triggered unsuccessfully by the called party, and sends the rollback message to the called SCP for refunding the PPS user. For the charging components that do not support a single charging message submitted for uniform charging, the called DCS B may work out multiple rollback messages and send them at this point uniformly.

In this embodiment, after the services that the calling party and the called party need to trigger are found, a uniform charging process is initiated, thus unifying the service charging control process and simplifying the VAS process. Before completion of all service processes, the information about the unsuccessfully triggered service is recorded; a uniform refunding process is initiated according to the information about all unsuccessfully triggered services, thus accomplishing the refund operation for the unsuccessfully triggered services.

Embodiment 6

This embodiment takes a CDMA network as an example, and employs the message process delivered by the home network of the called party. The VAS platform forwards the message submitted by the calling party to the home SMSC of the called party as required by the local user who has subscribed to the VAS, and then the home SMSC of the called party triggers the service and delivers the message.

Figure 8A:
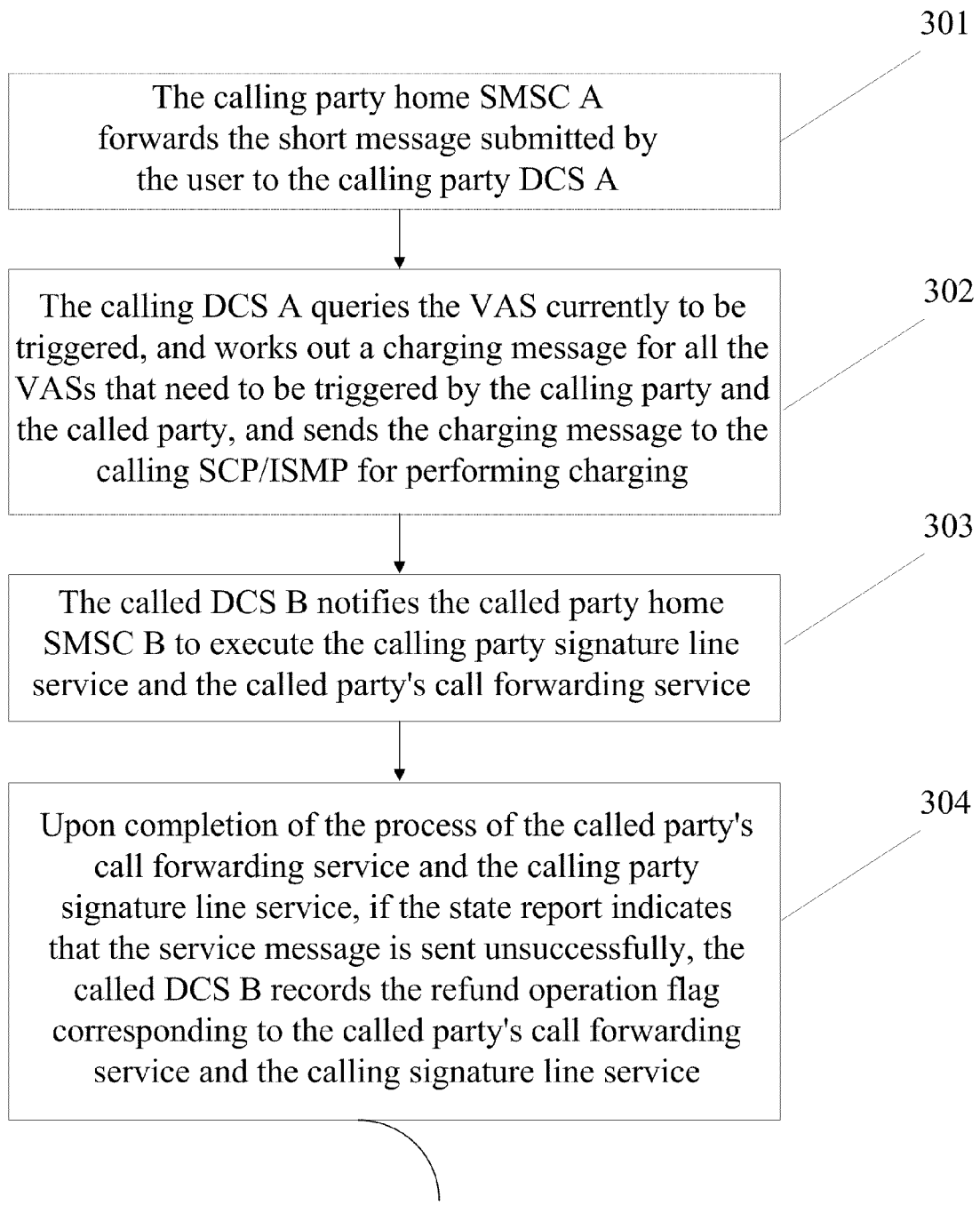
FIG. 8 is a flowchart of a method for charging a local user for a calling party service or a called party service in the PPS process in the home network of the called party in the sixth embodiment of the present disclosure.
Figure 8B:
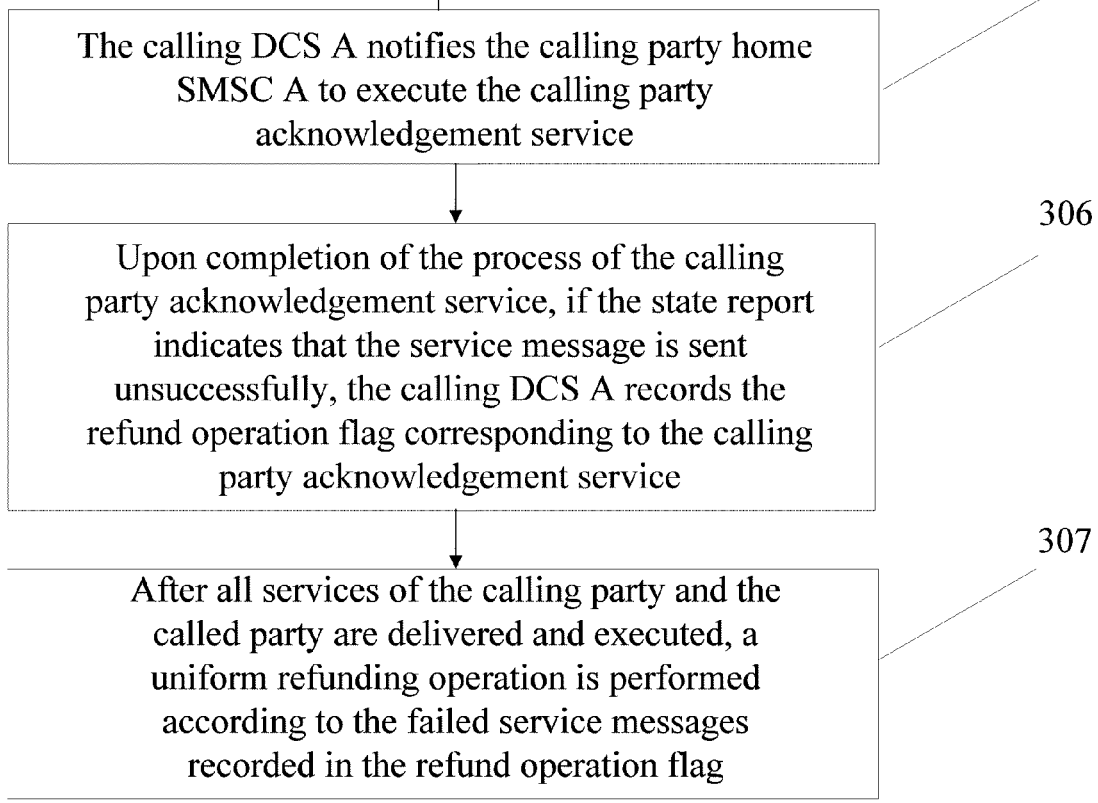

As shown in FIG. 8, this embodiment includes the following steps:

Step 301: The calling party home SMSC A obtains a message submitted by the calling party, queries whether the called party has subscribed to the short message VAS, and forwards the short message submitted by the user to the calling DCS A if the called party has subscribed to the short message VAS.

Step 302: The calling DCS A queries the services to be triggered currently (this embodiment supposes that the services to be triggered currently are: calling party return notification service, calling party signature line service, and called party's call forwarding service. In practice, the services to be triggered currently may be any other VASs provided by the operator), and then works out one or more charging messages for the services to be triggered currently by the calling party and the called party, and sends the charging messages to the calling SCP/ISMP for performing PPS charging.

Step 303: Through SMSC A, the calling DCS A notifies the called party home SMSC B to execute the calling party signature line service and the called party's call forwarding service.

Step 304: Upon completion of the process of the calling party signature line service and the process of the called party's call forwarding service, if the status report indicates that the service message is sent unsuccessfully, the calling DCS A records the refund operation flag corresponding to the calling party signature line service and the called party's call forwarding service.

Step 305: The calling DCS A notifies the calling party home SMSC A to execute the calling party return notification service.

Step 306: Upon completion of the process of the calling party return notification service, if the status report indicates that the service message is sent unsuccessfully, the calling DCS A records the refund operation flag corresponding to the calling party return notification service.

Step 307: By now, all calling party services and called party services have been delivered and executed. The calling DCS A performs uniform refund operation according to the failed service messages recorded in the refund operation flag. Specifically, the calling DCS A works out a rollback message for all services triggered unsuccessfully by the calling party and the called party, and sends the rollback message to the calling SCP for refunding the PPS user. The calling DCS A may also work out multiple rollback messages and send them to the calling ISMP for refunding the PPS user.

Figure 9A:
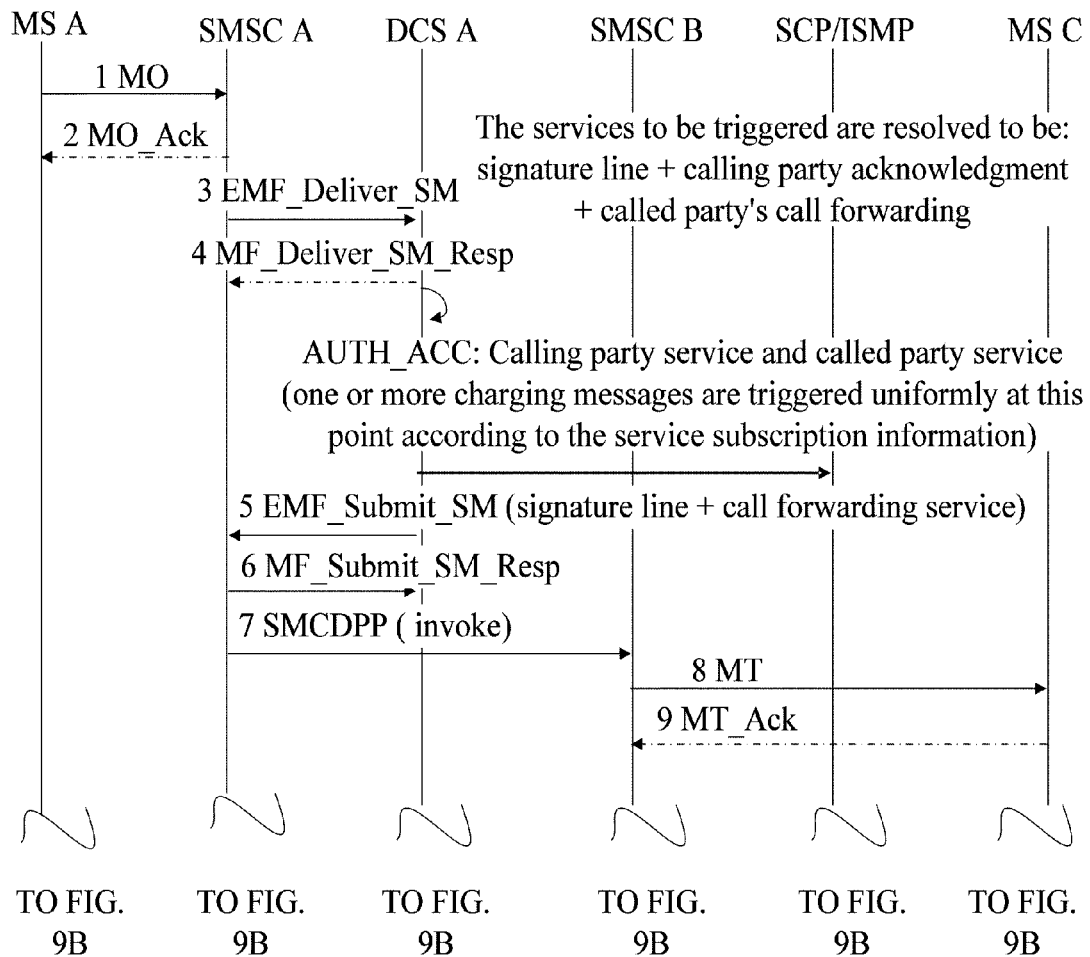
FIG. 9 shows exchange of charging messages for a local user in a calling party service or a called party service in the PPS process in the home network of the called party in the sixth embodiment of the present disclosure.
Figure 9B:
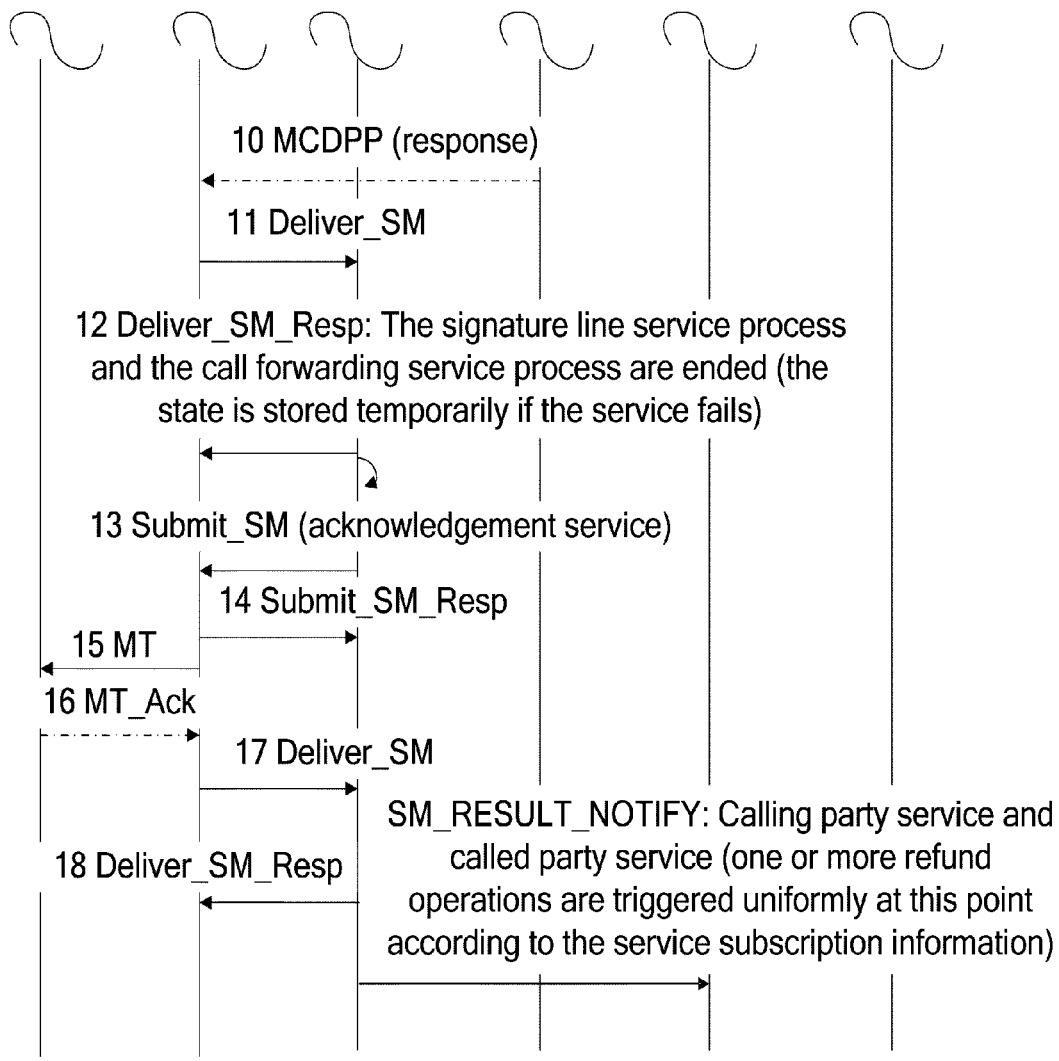

As shown in FIG. 9, the detailed process of this embodiment is as follows:

1: The calling user (MS A) submits a short message to the calling party home SMSC A.

2: The calling party home SMSC A sends back a response.

The calling party home SMSC A queries whether the calling party and the called party have subscribed to the short message VAS.

3: If the calling party and the called party have subscribed to the short message VAS, the calling party home SMSC A forwards the originally submitted short message to the calling DCS A for processing.

4: The calling DCS A returns a response to the calling party home SMSC A. This response indicates that the short message is processed by the calling DCS A.

Through querying, the calling DCS A finds that the services to be triggered currently are: calling party return notification, calling party signature line, and called party's call forwarding service. Before the service is really delivered, the calling DCS A works out a charging message for all the services to be triggered currently by the calling party and the called party, and sends the charging message to the calling SCP for performing PPS charging (if the charging component does not support a single charging message submitted for uniform charging, the calling DCS A needs to generate multiple charging messages for different services to be triggered, and submit them at this point uniformly).

5: The calling DCS A adds the service into the message, and submits the EMF_Submit_SM field message to the calling party home SMSC A.

6: The calling party home SMSC A returns an EMF_Submit_SM_Resp field to the calling DCS A.

7: The calling party home SMSC A submits the message that carries the service to the called party home SMSC B.

8: The called party home SMSC B delivers the service message to user C of the called party's call forwarding service.

9: User C returns a receiving response to the called party home SMSC B.

10: The called party home SMSC B sends the submitted response to the calling party home SMSC A.

11: The calling party home SMSC A sends the status report to the calling DCS A.

12: The calling DCS A returns a status report response to the calling party home SMSC A.

After completion of the process of the calling party signature line service, if the status report indicates that the message is sent unsuccessfully, the calling DCS records the refund operation flag corresponding to the called party's call forwarding service and the calling party signature line service (the refund operation is not performed here, but is performed uniformly after completion of all service processes).

13: The calling DCS A submits a message of the calling party return notification service to the calling party home SMSC A.

14: The calling party home SMSC A sends a response to the calling DCS A.

15: The calling party home SMSC A sends a calling party return notification to the calling party.

16: The calling party returns a receiving response to the calling party home SMSC A.

17: The calling party home SMSC A sends the status report of the calling party return notification to the calling DCS A.

18: The calling DCS A returns a status report response to the calling party home SMSC A. If the status report indicates that the message is sent unsuccessfully, the calling DCS records the refund operation flag corresponding to the calling party return notification service (the refund operation is not performed here, but is performed uniformly after completion of all service processes).

By now, all calling party services and called party services have been completed. Therefore, a uniform refund operation is performed for the services delivered unsuccessfully. The calling DCS A works out a rollback message for all the services triggered unsuccessfully by the calling party and the called party, and sends the rollback message to the calling SCP for refunding the PPS user; or works out multiple rollback messages and sends them to the calling SCP for refunding the PPS user (if the charging component does not support a single charging message submitted for uniform charging, the calling DCS A needs to generate multiple rollback messages, and submit them at this point uniformly).

In this embodiment, after the services that the calling party and the called party need to trigger are found, a uniform charging process is initiated, thus unifying the service charging control process and simplifying the VAS process; before completion of all service processes, the information about the unsuccessfully triggered service is recorded; a uniform refunding process is initiated according to the information about all unsuccessfully triggered services, thus accomplishing the refund operation for the unsuccessfully triggered services.

Embodiment 7

This embodiment takes a CDMA network as an example, and employs the message process delivered by the home network of the called party. The VAS platform forwards the message submitted by the calling party to the home SMSC of the called party as required by the non-local user who has subscribed to the VAS, and then the home SMSC of the called party triggers the service and delivers the message.

Figure 10A:
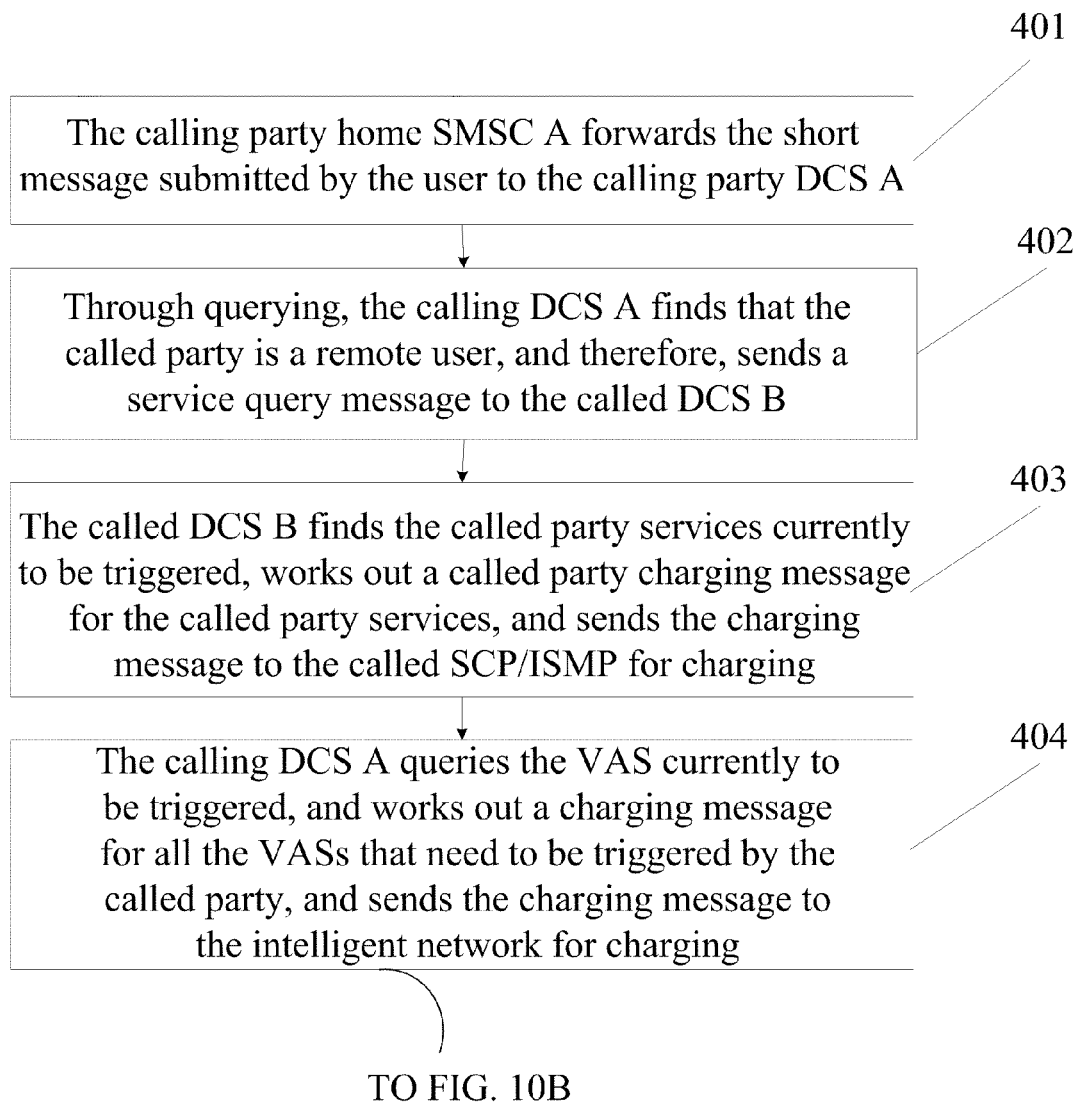
FIG. 10 is a flowchart of a method for charging a remote user for a calling party service or a called party service in the PPS process in the home network of the called party in the seventh embodiment of the present disclosure.
Figure 10B:
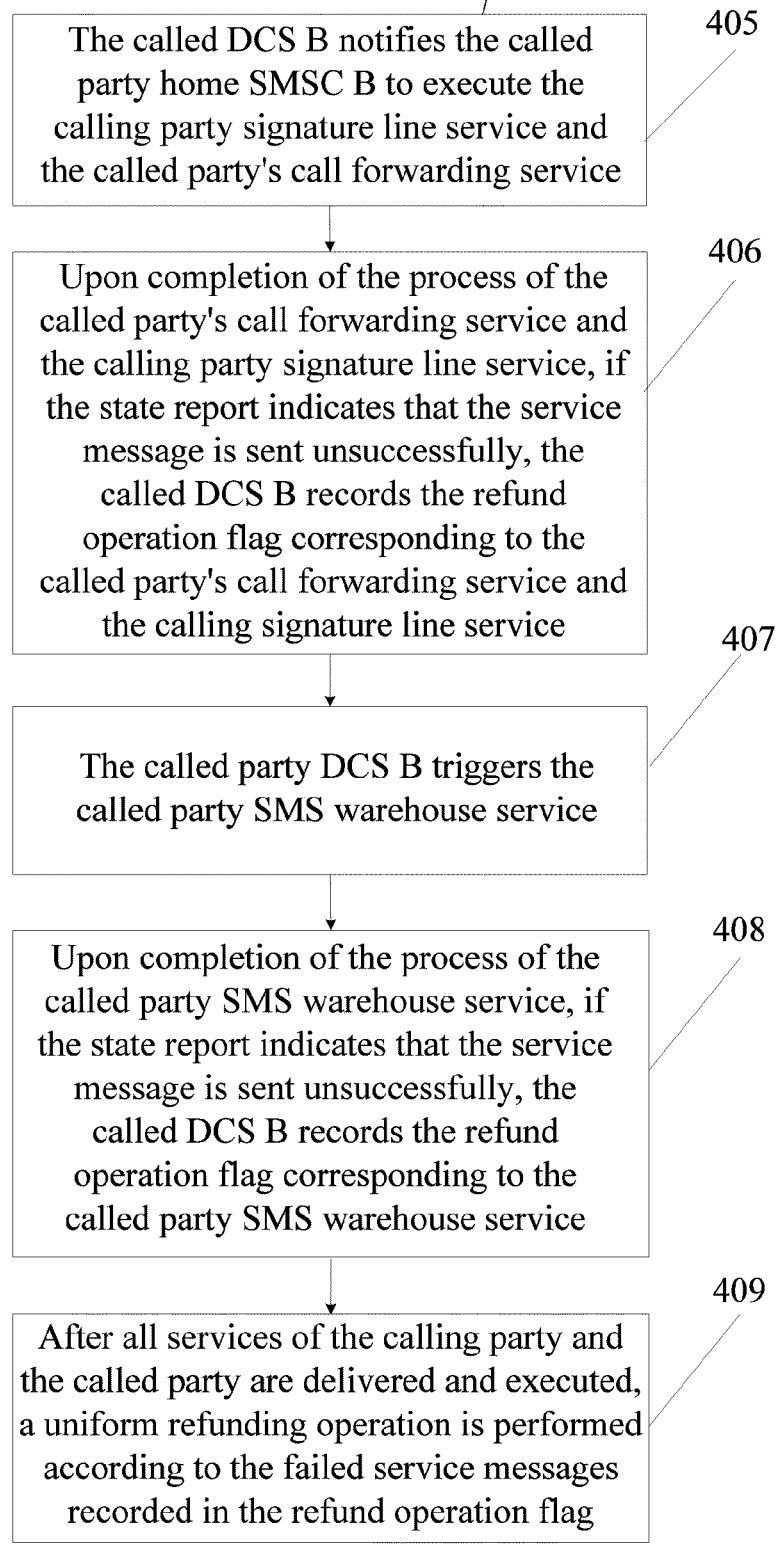

As shown in FIG. 10, this embodiment includes the following steps:

Step 401: The calling party home SMSC A obtains a short message submitted by the calling party, queries whether the called party has subscribed to the short message VAS, and forwards the short message submitted by the user to the calling DCS A if the called party has subscribed to the short message VAS.

Step 402: Through querying, the calling DCS A finds that the called party is a remote user, and therefore, sends a service query message to the called DCS B.

Step 403: Through querying, the called DCS B knows that the called party services to be triggered currently are the called party's call forwarding service and the called party warehouse service (or other types of called party services provided by the operator). The called DCS B works out a called party charging message for the called party services to be triggered, and sends the charging message to the called SCP for performing PPS charging; or works out multiple called party charging messages for the called party services to be triggered, and sends the charging messages to the called ISMP for performing PPS charging; and sends the service subscription result of the called party to the calling DCS A.

Step 404: Through querying, the calling DCS A finds that the service to be triggered currently by the calling party is the calling signature line. According to the query result sent by the called DCS B, the calling DCS A knows that the service to be triggered currently is the calling signature line service, and the called party services to be triggered are the called party's call forwarding and the called party warehouse service (this embodiment takes the foregoing three services as examples. In practice, the services may be other VASs provided by the operator). The calling DCS A works out a charging message for the calling party signature line service to be triggered by the calling party, and sends the charging message to the calling SCP for performing PPS charging; or works out multiple charging messages, and sends them to the calling ISMP for performing PPS charging (when there are multiple services to be triggered, one or more charging messages may be worked out).

Step 405: Through DCS B, the calling DCS A notifies the called party home SMSC B to execute the calling party signature line service and the called party's call forwarding service.

Step 406: Upon completion of the process of the calling party signature line service and the process of the called party's call forwarding service, if the status report indicates that the service message is sent unsuccessfully, the called DCS B records the refund operation flag corresponding to the calling party signature line service and the called party's call forwarding service.

Step 407: The called party DCS B triggers the called party SMS warehouse service.

Step 408: Upon completion of the process of the called party SMS warehouse service, if the status report indicates that the service message is sent unsuccessfully, the called DCS B records the refund operation flag corresponding to the called party SMS warehouse service.

Step 409: By now, all calling party services and called party services have been delivered and executed. A uniform refund operation is performed according to the failed service messages recorded in the refund operation flag. Specifically, the calling DCS A works out a rollback message for all services triggered unsuccessfully by the calling party and the called party, and sends the rollback message to the calling SCP for refunding the PPS user, or works out multiple rollback messages and sends them to the calling ISMP for refunding the PPS user; the called DCS B works out a rollback message for all services triggered unsuccessfully by the called party, and sends the rollback message to the called SCP for refunding the PPS user, or works out multiple rollback messages and sends them to the called ISMP for refunding the PPS user.

Figure 11A:
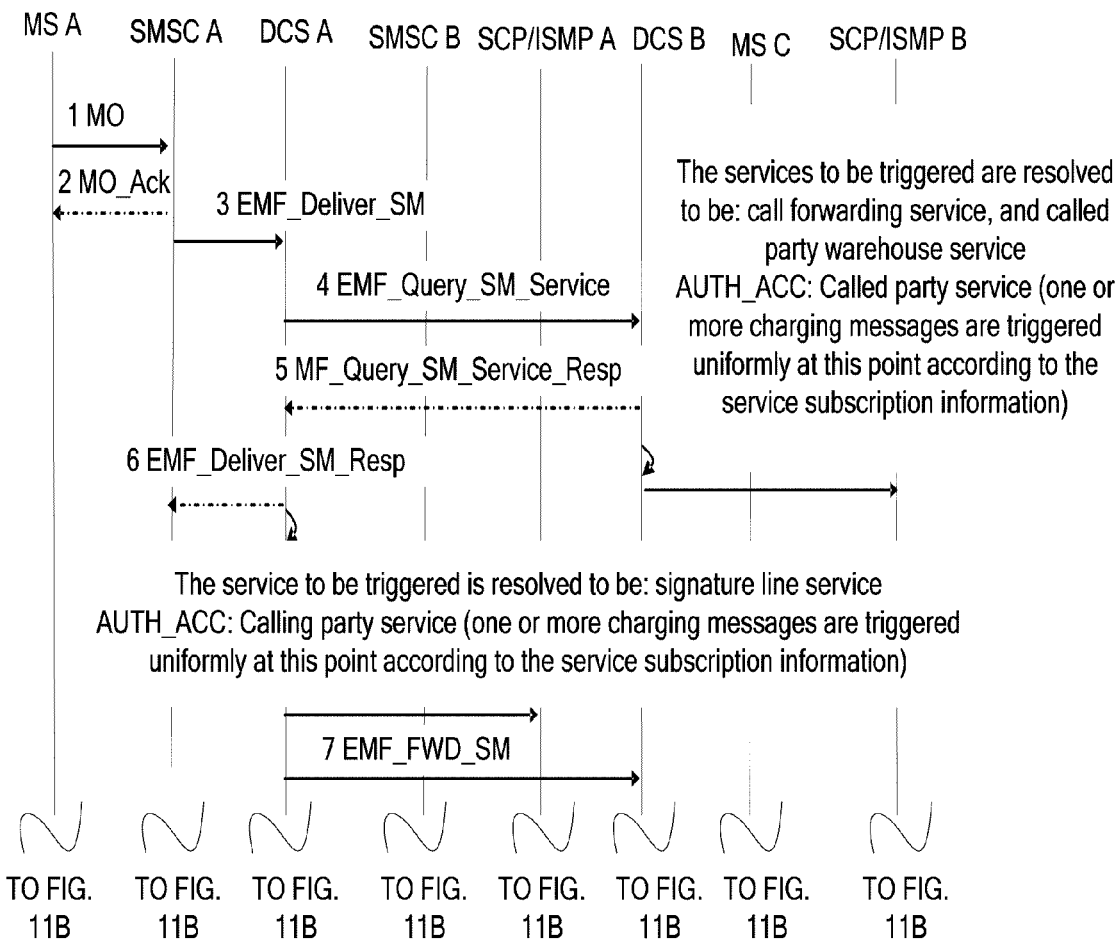
FIG. 11 shows exchange of charging messages for a remote user in a calling party service or a called party service in the PPS process in the home network of the called party in the seventh embodiment of the present disclosure.
Figure 11B:
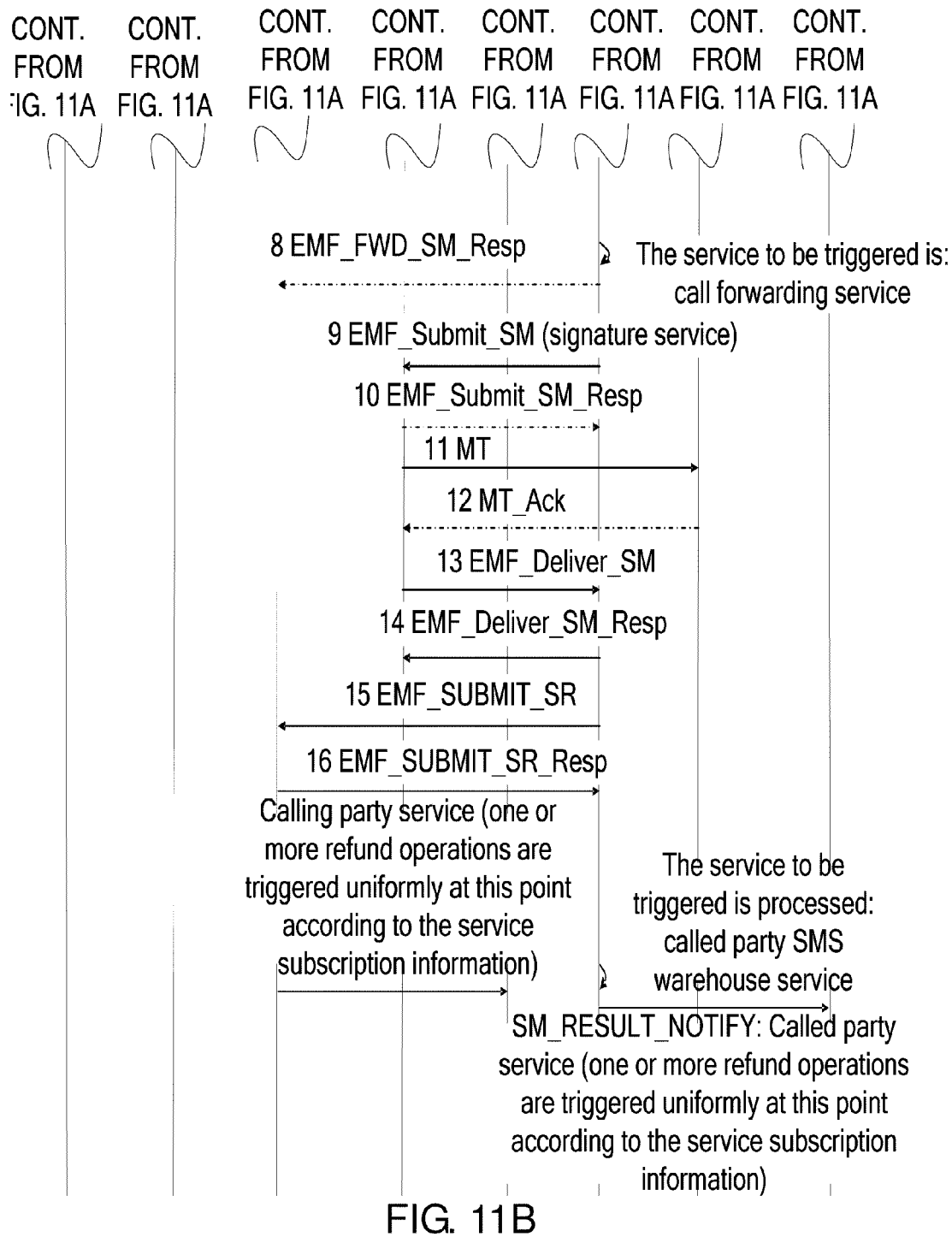

As shown in FIG. 11, the detailed interaction process of this embodiment is as follows:

1: The calling user (MS A) submits a short message to the calling party home SMSC A.

2: The calling party home SMSC A sends back a response.

The calling party home SMSC A queries whether the calling party and the called party have subscribed to the short message VAS.

3: If the calling party and the called party have subscribed to the short message VAS, the calling party home SMSC A forwards the originally submitted short message to the calling DCS A for processing.

4: The calling DCS A finds that the called party is a remote user, and therefore, sends a service query message to the called DCS B.

5: After querying, the called DCS B returns a service query result to the calling DCS A.

Through querying, the called DCS B works out a called party charging message for the called party services to be triggered currently, and sends the charging message to the called SCP for performing PPS charging (if the charging component does not support a single charging message submitted for uniform charging, the called DCS B needs to generate multiple charging messages for different services to be triggered, and submit them at this point uniformly).

6: The calling DCS A returns a response to the calling party home SMSC A. This response indicates that the short message is processed by the calling DCS A.

Through querying, the calling DCS A finds that the services to be triggered currently are: calling party signature line, called party's call forwarding service, and called party warehouse service. The calling DCS A works out a charging message for all the services to be triggered currently by the calling party, and sends the charging message to the calling SCP for performing PPS charging (if the charging component does not support a single charging message submitted for uniform charging, the calling DCS A needs to generate multiple charging messages for different services to be triggered, and submit them at this point uniformly).

7: After completion of triggering the calling party services, the calling DCS A transmits the services to the called DCS B transparently.

8: The called party DCS B returns a call forwarding response, namely, a "EMF_FWD_SM_Resp" field, to the calling DCS A.

The called party DCS B triggers the called party's call forwarding service according to the forwarded message.

9: The called DCS B adds the service into the message, and submits the EMF_Submit_SM field message to the called party home SMSC B.

10: The called party home SMSC B returns an EMF_Submit_SM_Resp field to the called DCS B.

11: The called party home SMSC B delivers the service message to user C of the called party's call forwarding service.

12: User C returns a receiving response to the called party home SMSC B.

13: The called party home SMSC B sends the status report to the called DCS B.

14: The called DCS B returns a status report response to the called party home SMSC B.

If the status report indicates that the service message is sent unsuccessfully, the called DCS B records the refund operation flag corresponding to the called party service, and at the same time, the called DCS B triggers the called party SMS warehouse service.

After completion of the service process, the called DCS B works out a rollback message according to the status of triggering all the services of the called party, and sends the rollback message to the called SCP for refunding the PPS user (if the charging component does not support a single charging message submitted for uniform charging, the calling DCS A needs to generate multiple messages, and submit them at this point uniformly).

15: The called party DCS B transmits the status report to the calling DCS A.

16: The calling DCS A returns a status report response to the called DCS B. If the status report indicates that the service message is sent unsuccessfully, the calling DCS A records the refund operation flag corresponding to the calling party service.

By now, all calling party services have been completed, and the delivery results are known. Therefore, a uniform refund operation is performed for the services delivered unsuccessfully. The calling DCS A works out a rollback message according to the status of triggering all the services of the calling party, and sends the rollback message to the calling SCP for refunding the PPS user (if the charging component does not support a single charging message submitted for uniform charging, the calling DCS A needs to generate multiple messages, and submit them at this point uniformly).

In this embodiment, after the services that the calling party and the called party need to trigger are found, a uniform charging process is initiated, thus unifying the service charging control process and simplifying the VAS process; before completion of all service processes, the information about the unsuccessfully triggered service is recorded; a uniform refunding process is initiated according to the information about all unsuccessfully triggered services, thus accomplishing the refund operation for the unsuccessfully triggered services.

If the service is delivered reciprocally between multiple networks of the same operator (for example, between a CDMA network and a GSM network of China Unicorn), the charging process and the service process are triggered according to the standard process of the CDMA network uniformly.

Embodiment 8

Figure 12:
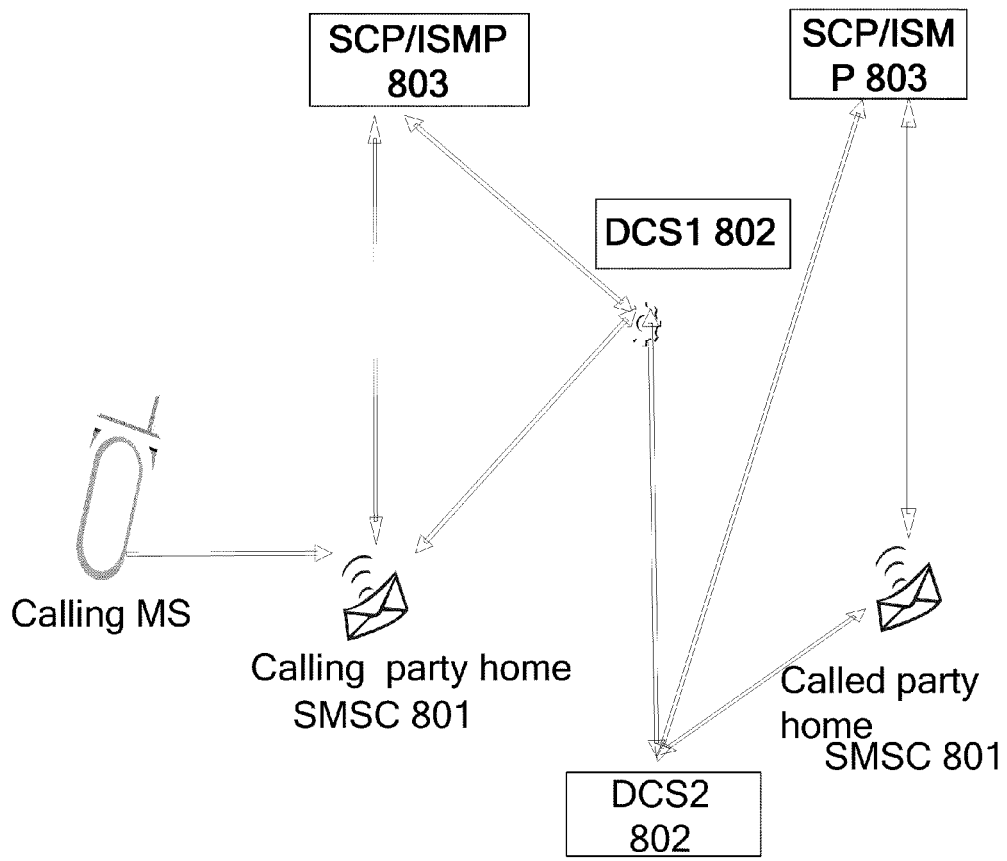
FIG. 12 is a structure of a short message VAS PPS system provided in the eighth embodiment of the present disclosure.

This embodiment provides a system for charging a PPS user for a short message VAS. Taking the GSM network or the CDMA network as an example, the charging process is a local user charging process for calling party services and called party services, or a remote user charging process for calling party services and called party services, delivered by the home network of the calling party or the called party. As shown in FIG. 12, the system includes:

an SMSC 801, adapted to: receive a short message submitted by the calling party, and send the received short message to the DCS for processing;

a DCS 802, adapted to: obtain the short message that carries VAS subscription information from the SMSC, resolve the VAS to be triggered according to the short message that carries the VAS subscription information, generate a charging message, and send the charging message to an intelligent network for charging; and an intelligent network 803, adapted to perform charging for the SMS user according to the charging message sent by the DCS 802.

The DCS 802 is a calling DCS; accordingly, the calling DCS is adapted to: query the VAS to be triggered currently, and work out a charging message for the services that need to be triggered by the calling party and the called party, and send the charging message to the intelligent network for charging.

Alternatively, the DCS 802 includes a calling DCS and a called DCS; and the intelligent network 803 includes a calling intelligent network and a called intelligent network.

The calling DCS is adapted to: query the VAS to be triggered currently, and work out a calling party charging message for the VAS that needs to be triggered by the calling party, and send the charging message to the calling intelligent network for charging.

The called DCS is adapted to: query the VAS to be triggered currently, and work out a called party charging message for the VAS that needs to be triggered by the called party, and send the charging message to the called intelligent network for charging.

Further, the DCS 802 in the system in this embodiment is adapted to: after the VAS is triggered unsuccessfully, resolve the VAS triggered unsuccessfully, and record the refund operation flag corresponding to the unsuccessfully triggered VAS, generate a refund message according to the refund operation flag, and send the refund message to the intelligent network for refunding.

Accordingly, the intelligent network 803 is further adapted to refund the SMS user according to the failed services recorded in the refund operation flag.

In the short message VAS charging system provided in this embodiment, the SMSC does not deliver services to the SCP/ISMP; the process is collated between the SMSC, the DCS, and the SCP; a uniform charging process is initiated after the VAS that needs to be triggered by the calling party and the called party is found. Therefore, the VAS platform works together with the intelligent network to charge the PPS user, and the service process is simplified.

Embodiment 9

Figure 13:
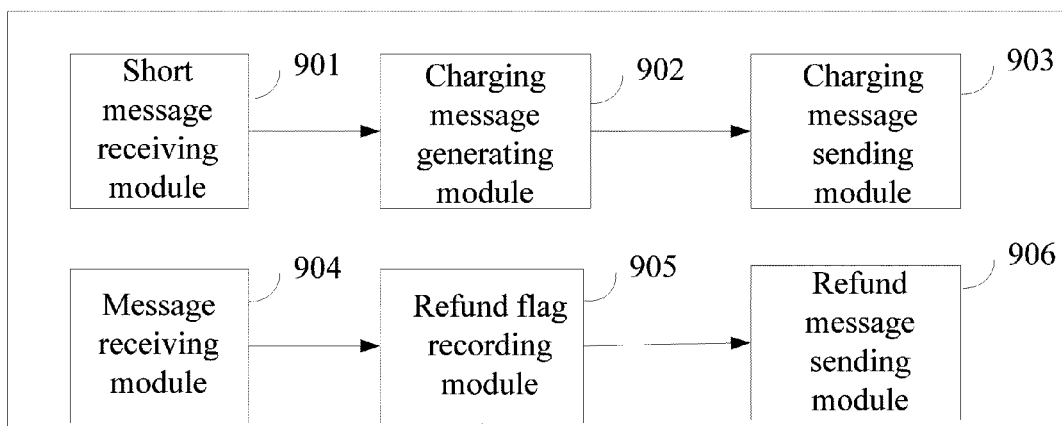
FIG. 13 is a structure of a DCS provided in the ninth embodiment of the present disclosure.

This embodiment provides a DCS. Taking the GSM network or the CDMA network as an example, the charging process is a local user charging process for calling party services and called party services, or a remote user charging process for calling party services and called party services, delivered by the home network of the calling party or the called party. As shown in FIG. 13, the DCS includes:

a short message receiving module 901, adapted to obtain a short message that carries VAS subscription information and is sent by an SMSC and submitted by a calling party;

a charging message generating module 902, adapted to: resolve the VAS to be triggered according to the short message that is received by the short message receiving module 901 and carries the VAS subscription information, and generate a charging message; and a charging message sending module 903, adapted to send the charging message generated by the charging message generating module 902 to the intelligent network for charging.

Specifically, the charging message generating module 902 is:

a charging message generating unit, adapted to: query the VAS to be triggered currently, and work out a charging message for the VAS that needs to be triggered by the calling party and the called party.

The charging message generating module includes:

a first charging message generating unit, adapted to: query the VAS to be triggered currently, and work out a calling party charging message for the VAS that needs to be triggered by the calling party; and a second charging message generating unit, adapted to: query the VAS to be triggered currently, and work out a called party charging message for the VAS that needs to be triggered by the called party.

Further, the DCS provided in this embodiment includes:

a message receiving module 904, adapted to receive a message about failure of triggering a VAS;

a refund flag recording module 905, adapted to: resolve the VAS triggered unsuccessfully according to the message about failure of triggering the VAS, and record the user refund operation flag corresponding to the VAS triggered unsuccessfully; and a refund message sending module 906, adapted to: generate a refund message according to the refund operation flag, and send the refund message to the intelligent network for refunding.

The DCS provided in this embodiment initiates a uniform charging process after finding the VAS that needs to be triggered by the calling party and the called party. Therefore, the VAS platform works together with the intelligent network to charge the PPS user, and the service charging process is simplified.

The technical solution under the present disclosure is applicable to triggering all short message VASs in addition to the services in the foregoing service charging processes. The charging process is not limited to the services mentioned above.

The technical solution initiates a uniform charging process after querying the services that need to be triggered by the calling party and the called party, thus simplifying the service process. Before termination of all service processes, the information about all the services triggered unsuccessfully is recorded; after termination of all service processes, a uniform refunding process is initiated according to the information about all the services triggered unsuccessfully. Therefore, the user is refunded for all the services triggered unsuccessfully, the service process is simplified, and the VAS platform works together with the intelligent network to charge the PPS user in the sophisticated service networking.

The software for implementing the embodiments of the present disclosure may be stored in a computer-readable storage medium. When being executed, the software performs these steps: obtaining the short message that carries VAS subscription information, resolving the VAS to be triggered according to the short message that carries the VAS subscription information, generating a charging message, and sending the charging message to the intelligent network for charging. The storage medium may be a Read Only Memory (ROM)/Random Access Memory (RAM), magnetic disk or compact disk.

Although the invention has been described through some exemplary embodiments, the invention is not limited to such embodiments. It is apparent that those skilled in the art can make modifications and variations to the invention without departing from the spirit and scope of the invention. The invention is intended to cover the modifications and variations provided that they fall in the scope of protection defined by the following claims or their equivalents.

What is claimed is:

1. A method for charging for a short message value-added service (VAS), comprising:

obtaining a short message that carries VAS subscription information, which comprises:

obtaining, by a calling Data Center for Short Message Service (DCS), the short message that carries VAS subscription information;

resolving the VAS to be triggered according to the short message that carries the VAS subscription information, and generating a charging message, which comprises:

querying the VAS to be triggered currently, and working out the charging message for the services that need to be triggered by a calling party and a called party, which comprises:

forwarding, by the calling DCS, the VAS to be triggered currently to a called DCS, querying, by the calling DCS, the VAS to be triggered currently, and working out a calling party charging message for the services that need to be triggered by the calling party;

querying, by the called DCS, the VAS to be triggered currently, and working out a called party charging message for the services that need to be triggered by the called party; and sending the charging message to an intelligent network for charging, which comprises:

sending, by the calling DCS, the calling party charging message to a calling intelligent network for charging; and sending, by the called DCS, the calling party charging message to a called intelligent network for charging.

2. The method of claim 1, further comprising:

receiving, by the calling DCS and a called DCS, a message about failure of triggering a VAS, respectively;

by the calling DCS and a called DCS, resolving the VAS triggered unsuccessfully according to the message about failure of triggering the VAS, and recording the calling user refund operation flag and the called user refund operation flag corresponding to the VAS triggered unsuccessfully, respectively;

by the calling DCS and a called DCS, generating a refund message according to the calling refund operation flag and a called refund operation flag, and sending the refund message to the calling intelligent network and the called intelligent network for refunding, respectively.

3. A system for charging for a short message value-added service (VAS), comprising:

a Data Center for Short Message Service (DCS), adapted to obtain the short message that carries VAS subscription information, resolve the VAS to be triggered according to the short message that carries the VAS subscription information, generate a charging message, and send the charging message to an intelligent network for charging, wherein the DCS comprises a calling DCS and a called DCS; and the intelligent network includes a calling intelligent network and a called intelligent network; and the calling DCS is adapted to query the VAS to be triggered currently, and work out a calling party charging message for the VAS that needs to be triggered by the calling party, and send the charging message to the calling intelligent network for charging, the called DCS is adapted to query the VAS to be triggered currently, and work out a called party charging message for the VAS that needs to be triggered by the called party, and send the charging message to the called intelligent network for charging; and an intelligent network, adapted to perform PrePaid Service (PPS) charging for the user according to the charging message sent by the DCS.

4. The system of claim 3, further comprising:
   a Short Message Service Center (SMSC), adapted to receive a short message submitted by the calling party, and send the received short message to the DCS for processing.

5. The system of claim 3, wherein the DCS is further adapted to resolve the VAS triggered unsuccessfully after the VAS is triggered unsuccessfully, and record the refund operation flag corresponding to the unsuccessfully triggered VAS, generate a refund message according to the refund operation flag, and send the refund message to the intelligent network for refunding, and
   the intelligent network is correspondingly adapted to refund the SMS user according to the failed services recorded in the refund operation flag.

6. A Data Center for Short Message Service (DCS), comprising:
   a short message receiving module, adapted to obtain a short message that carries short message value-added service (VAS) subscription information;
   a charging message generating module, adapted to: resolve the VAS to be triggered according to the short message that is received by the short message receiving module and carries the VAS subscription information, and generate a charging message, wherein the charging message generating module comprises:
      a first charging message generating unit, adapted to query the VAS to be triggered currently, and work out a calling party charging message for the VAS that needs to be triggered by the calling party; and
      a second charging message generating unit, adapted to query the VAS to be triggered currently, and work out a called party charging message for the VAS that needs to be triggered by the called party; and
   a charging message sending module, adapted to send the charging message generated by the charging message generating module to the intelligent network for charging.

7. The DCS of claim 6, wherein the DCS further comprises:
   a message receiving module, adapted to receive a message about failure of triggering a VAS;
   a refund flag recording module, adapted to: resolve the VAS triggered unsuccessfully according to the message about failure of triggering the VAS, and record the user refund operation flag corresponding to the VAS triggered unsuccessfully; and
   a refund message sending module, adapted to: generate a refund message according to the refund operation flag, and send the refund message to the intelligent network for refunding.

* * * * *